United States Patent
Wilde et al.

(10) Patent No.: US 12,007,738 B2
(45) Date of Patent: Jun. 11, 2024

(54) DYNAMIC MONITORING

(71) Applicant: HEWLETT PACKARD ENTERPRISE DEVELOPMENT LP, Houston, TX (US)

(72) Inventors: Torsten Wilde, Berlin (DE); Jeffrey C. Hanson, Lakewood, OH (US); Aamir Arshad Rashid, Sharon, MA (US); Michael McKay, Wellesley (CA)

(73) Assignee: Hewlett Packard Enterprise Development LP, Spring, TX (US)

( * ) Notice: Subject to any disclaimer, the term of this patent is extended or adjusted under 35 U.S.C. 154(b) by 491 days.

(21) Appl. No.: 17/215,238

(22) Filed: Mar. 29, 2021

(65) Prior Publication Data

US 2022/0308544 A1    Sep. 29, 2022

(51) Int. Cl.
*G05B 19/042* (2006.01)
*G06F 16/16* (2019.01)
*H04L 67/12* (2022.01)

(52) U.S. Cl.
CPC ....... *G05B 19/0428* (2013.01); *G06F 16/164* (2019.01); *H04L 67/12* (2013.01); *G05B 2219/24015* (2013.01); *G05B 2219/25068* (2013.01)

(58) Field of Classification Search
None
See application file for complete search history.

(56) References Cited

U.S. PATENT DOCUMENTS

| | | | |
|---|---|---|---|
| 9,577,906 B2 | 2/2017 | Ferreira et al. | |
| 2006/0150248 A1* | 7/2006 | Ross | H04L 63/1433 726/25 |
| 2007/0262863 A1* | 11/2007 | Aritsuka | H04B 17/27 370/254 |
| 2012/0197856 A1* | 8/2012 | Banka | H04L 67/2885 707/706 |
| 2015/0095514 A1* | 4/2015 | Yu | G06F 16/245 709/242 |
| 2015/0381738 A1* | 12/2015 | Azuma | H04L 67/12 702/188 |
| 2018/0285596 A1* | 10/2018 | Jones | G06F 21/552 |
| 2021/0157312 A1* | 5/2021 | Cella | G01M 13/045 |

OTHER PUBLICATIONS

Agelastos et al., The Lightweight Distributed Metric Service: A Scalable Infrastructure for Continuous Monitoring of Large Scale Computing Systems and Applications, 2014 (12 pages).
Avro, Apache Avro 1.10.1 Documentation downloaded Feb. 11, 2021 (2 pages).

(Continued)

*Primary Examiner* — Schquita D Goodwin
*Assistant Examiner* — Jonathan A Sparks
(74) *Attorney, Agent, or Firm* — Trop, Pruner & Hu, P.C.

(57) ABSTRACT

In some examples, a controller dynamically configures a property associated with monitoring performed by an agent. The controller stores, in a repository, metadata relating to the agent. The controller receives, from the agent, first sensor data that excludes the metadata, and uses indexing information in the first sensor data to retrieve the metadata from the repository.

18 Claims, 4 Drawing Sheets

(56) References Cited

OTHER PUBLICATIONS

Bautista et al., Collecting, Monitoring, and Analyzing Facility and Systems Data at the National Energy Research Scientific Computing Center, ICPP 2019, Aug. 5-8, 2019, Kyoto, Japan (9 pages).
Hewlett-Packard Enterprise, HPE Performance Cluster Manager—Overview downloaded Feb. 11, 2021 (4 pages).
Katsaros G. et al., A Self-adaptive hierarchical monitoring mechanism for Clouds, (Research Paper), Preprint submitted to Journal of Systems and Software: Computer Systems and Networks, Jul. 28, 2011, 20 Pgs.
Kutare, M. et al., Monalytics: Online Monitoring and Analytics for Managing Large Scale Data Centers, (Research Paper), ICAC'10, Washington, DC, USA, Jun. 7-11, 2010, 11 Pgs.
Magnoni, L et al. Monitoring WLCG with lambda-architecture: a new scalable data store and analytics platform for monitoring at petabyte scale., 21st International Conference on Computing in High Energy and Nuclear Physics, Dec. 2015, 10 Pgs.
Mastelic T et. al., Data velocity scaling via dynamic monitoring frequency on ultrascale infrastructures, Nov. 2015, 5 Pgs.
Mouzakitis, E., Datadog, What is Kafka? Apr. 6, 2020 (29 pages).
Netti et al., From Facility to Application Sensor Data: Modular, Continuous and Holistic Monitoring with DCDB, Aug. 14, 2019 (12 pages).
Prometheus, What is Prometheus downloaded Feb. 11, 2021 (4 pages).

\* cited by examiner

DYNAMIC MONITORING

This invention was made with government support under Contract: No. DE-AC52-07NA27344 awarded by the Department of Energy National Nuclear Security Administration (DOE/NNSA). The government has certain rights in the invention.

BACKGROUND

System management can be performed to control various electronic devices in response to events (e.g., security events such as a malware attack, a fault or error, etc.) or to achieve target operational objectives. System monitoring can be performed to collect data for the purpose of determining an operational characteristic of the computing environment.

BRIEF DESCRIPTION OF THE DRAWINGS

Some implementations of the present disclosure are described with respect to the following figures.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

In the present disclosure, use of the term "a," "an," or "the" is intended to include the plural forms as well, unless the context clearly indicates otherwise. Also, the term "includes," "including," "comprises," "comprising," "have," or "having" when used in this disclosure specifies the presence of the stated elements, but do not preclude the presence or addition of other elements.

A monitoring system for a computing environment can include agents that perform collection of monitoring data. An "agent" can refer to an entity that collects monitoring data of a computing environment. An agent can include a device or multiple devices. A device can refer an entity (logical or physical) for organizing sensors. A sensor refers to an entity that acquires measurement data (also referred to as "sensor data") relating to the computing environment. The sensor can be a hardware sensor or a sensor implemented using machine-readable instructions. Examples of measurement data that can be collected by sensors include any or some combination of the following: resource usage (such as usage of a processing resource, a communication resource, a storage resource, etc.), event information (e.g., information relating to anomalies, such as data errors, program faults, hardware failures, information indicating an attack by an unauthorized entity such as malware or a human, a temperature exceeding a threshold, resource performance being less than a threshold, etc.), environment data (e.g., temperature, pressure, information relating to system infrastructure such as cooling equipment, etc.), and so forth.

In some examples, a monitoring system can employ a static configuration in which characteristics of data collection are statically set and/or the agents used to collect sensor data are static. For example, the quantity of agents can be fixed, or a monitoring system can specify that agents be provided by specific entities (e.g., companies, individuals, organizations, etc.). The monitoring system may not be able to accept monitoring data from agents not provided by the specified entities.

Moreover, different types of agents can employ different sensor data formats, which can raise the issue of compatibility with the monitoring system.

In accordance with some implementations of the present disclosure, a dynamic monitoring system dynamically configures agents that include respective sensors to monitor a computing environment, which can include electronic devices. The computing environment can include a network to which the electronic devices are coupled. Examples of networks include local area networks, wide area networks, storage area networks, public networks, and so forth. Examples of electronic devices include computers (e.g., desktop computers, notebook computers, server computers, tablet computers, etc.), storage systems, communication nodes, vehicles, vehicle controllers, appliances, and so forth. In some examples, a computing environment can also include support infrastructure such as a cooling system, a power delivery system, and so forth.

A computing environment can include a computing cloud environment, a data center, or any other type of environment including electronic devices.

The dynamic monitoring system receives sensor data and metadata that is separate from the sensor data. "Sensor data" refers to any data collected as part of monitoring a computing environment. Sensor data can include raw measurement data from a sensor, or transformed/processed data based on the raw measurement data. Sensor data can also include information of events that have been detected.

Separation of the sensor data and the metadata allows the metadata to be communicated once or infrequently, such that sensor data that is more frequently transmitted does not have to include the metadata. Messages containing sensor data without metadata can have a reduced size as compared to messages that contain both sensor data and metadata. Moreover, in some examples, the sensor data can be according to a specified format according to a syntax that governs formatting of sensor data transmitted by various agents that interact with the dynamic monitoring system.

Figure 1:
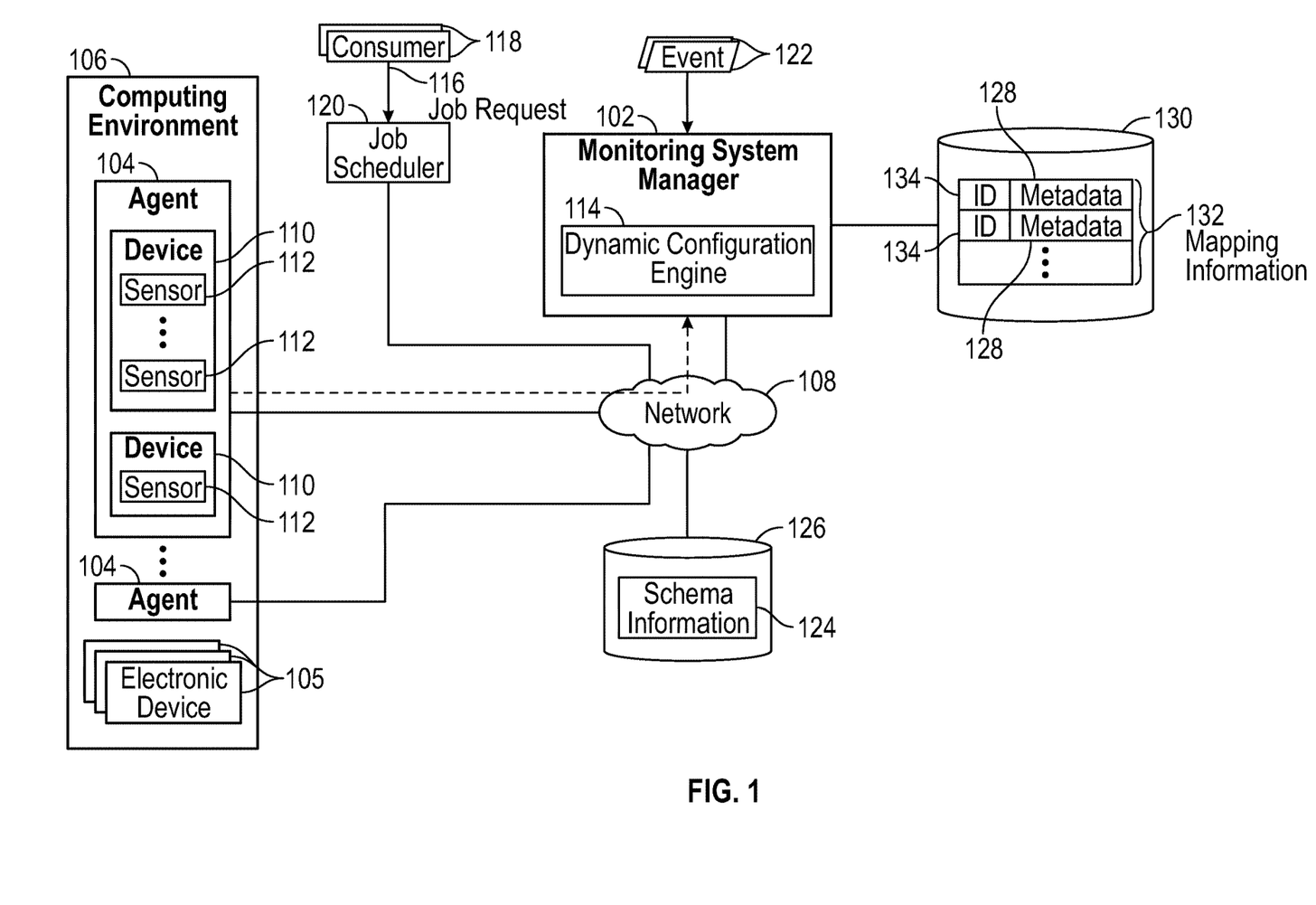
FIG. 1 is a block diagram of an arrangement including a monitoring system manager, according to some examples.

FIG. 1 is a block diagram of an example arrangement that includes a monitoring system manager 102 that is able to interact with agents 104 that collect sensor data relating to various aspects of a computing environment 106. Note that the agents 104 can be deployed as part of the computing environment 106, such as machine-readable instructions and/or hardware components that are part of or coupled to electronic devices 105 and/or other equipment of the computing environment 106. In other examples, agents 104 may be separate from the computing environment 106, and can either be coupled over a network (e.g., 108) to the computing environment 106.

The monitoring system manager 102 includes a number of computing device that can communicate with the agents 104 over the network 108. As used here, a "number" of elements can refer to one element or multiple elements.

In examples according to FIG. 1, each agent 104 includes a number of devices 110. A device 110 is a logical or physical entity that organizes a number of sensors 112. As an example, a device can include a thermostat that can have a number of sensors. As another example, a device can include a network card that has multiple ports, where each port can be connected to a respective sensor. As a further example, a device can be a group of sensors.

In examples according to FIG. 1, although devices 110 and sensors 112 are depicted as being part of each respective agent 104, it is noted that a device and/or sensor may be external of the agent 104 but communicatively coupled to the agent 104.

In other examples, the concept of a device 110 for organizing a number of sensors 112 is not employed. In such examples, a sensor 112 can be either part of the agent 104 or can be communicatively coupled to the agent 104.

The monitoring system manager 102 includes a dynamic configuration engine 114. As used here, an "engine" can refer to a hardware processing circuit, which can include any or some combination of a microprocessor, a core of a multi-core microprocessor, a microcontroller, a programmable integrated circuit, a programmable gate array, or another hardware processing circuit. Alternatively, an "engine" can refer to a combination of a hardware processing circuit and machine-readable instructions (software and/or firmware) executable on the hardware processing circuit.

The dynamic configuration engine 114 is able to dynamically configure a number of properties associated with monitoring performed by a number of agents 104, such as to meet changing specifications (e.g., from customers or the monitoring framework itself). Such dynamically configured properties are part of a monitoring configuration.

Examples of properties that can be dynamically configured by the dynamic configuration engine 114 include any or some collection of the following: a frequency of collection of sensor data, a quantity of sensor data to be collected, specific sensors to be employed (which can include enabling and/or disabling sensors and/or removing or adding new sensors), and so forth.

In some examples, changing the frequency or quantity of sensor data collection allows the dynamic configuration engine 114 to adjust the ingress rate of incoming sensor data, to meet requirements set by customers, for example. Changing properties of monitoring performed by agents 104 can also vary the load placed on resources in association with sensor data collection. For example, an increased ingress rate of incoming sensor data can lead to increased usage of storage and communication resources. Also, having to process a larger quantity of incoming sensor data can also lead to an increased usage of processing resources. Processing of sensor data can include converting the sensor data to another form, such as a human readable form, a database format that is capable of being queried, and so forth.

The dynamic configuration performed by the dynamic configuration engine 114 can be for each specific monitoring job to be performed by the monitoring system manager 102. A monitoring job can refer to an operation involving collection of sensor data: for a specific number of electronic devices 105 and/or other equipment of the computing environment 106, at specified times, for a specified number of metrics (e.g., a resource usage metric, etc.), in response to specified event(s), and so forth.

A monitoring job can be requested using a job request 116 that is received from a consumer 118 by a job scheduler 120. The job scheduler 120 can be implemented using a number of computing devices. The job scheduler 120 can be included as part of the monitoring system manager 102 and/or can be external of the monitoring system manager 102.

A "consumer" can refer to an electronic device, a program (including machine-readable instructions), or a user. The job request 116 is sent from the consumer 118 to the job scheduler 120 over a network (e.g., 108) or is received at a user interface of the job scheduler 120.

A job request can specify information relating to a monitoring job, such as a number of metrics to be monitored, a number of electronic devices and/or other equipment to be monitored, a schedule relating to the times at which monitoring is to occur, event(s) that trigger collection of sensor data, and so forth.

The job scheduler 120 is to schedule a monitoring job for execution. In some cases, the job scheduler 120 can receive multiple job requests from a consumer 118 or from multiple consumers 118. The job requests received by the job scheduler 120 can be stored in a job request queue (contained in a memory, for example) of the job scheduler 120. This job scheduler 120 can then execute monitoring jobs for respective job requests according to a specified order, such as based on time of receipt of a job request, a priority of the job request, and/or based on any other factor or combination of factors.

For a monitoring job scheduled by a job scheduler, the dynamic configuration engine 114 of the monitoring system manager 102 can dynamically configure a number of properties associated with monitoring performed by agents 104. The dynamic configuration can be performed before the start of any given monitoring job, and/or can be performed during the given monitoring job.

In some examples, different events 122 (e.g., a time event, an anomaly event, or another event) can cause the dynamic configuration engine 114 to change the monitoring configuration of a monitoring job. For example, the dynamic configuration engine 114 can vary the monitoring configuration of the monitoring job at different times. As another example, the dynamic configuration engine 114 can vary the monitoring configuration of the monitoring job for different levels of anomalies (e.g., data errors, program faults, hardware failures, an attack, etc.).

In further examples, the monitoring system manager 102 can trigger a monitoring job that is not requested in any job request from a consumer 118. For example, the monitoring system manager 102 can trigger a monitoring job in response to certain events 122, such as an anomaly. For such a monitoring job triggered by an event 122, the dynamic configuration engine 114 can dynamically configure a number of properties associated with monitoring performed by agents 104 in response to the event 122.

Dynamically changing a monitoring configuration for a first monitoring job may lead to changed usage of resources used in the monitoring. For example, increasing the frequency of data collection by sensors can result in increased data storage, increased data communications, and increased processing workload for the first monitoring job. If multiple monitoring jobs are competing for the same set of resources, then increased resource allocation for the first monitoring job can be offset by reducing resource allocation for a second monitoring job, by changing the monitoring configuration for the second monitoring job.

In addition to the ability to perform dynamic configuration of monitoring jobs, a monitoring framework provided by the monitoring system manager 102 also supports separation of metadata and sensor data such that the agents 104 can send sensor data to the monitoring system manager 102 without including the metadata in the messages containing the sensor data. A "message" can refer to any unit of data, such as a packet, a frame, etc., that is used to carry sensor data. There can be quite a large quantity of metadata associated with sensor data, such that having to include metadata in messages containing sensor data can add to the overall size of each message that can consume network bandwidth.

The metadata for a data collection entity (e.g., an agent 104, a device 110, and/or a sensor 112) can be communicated to the monitoring system manager 102 just once or less frequently than sensor data from the data collection entity. For example, the metadata can be communicated to the monitoring system manager 102 as part of a registration process (discussed further below).

The monitoring system manager 102 can store metadata 128 received by the monitoring system manager 102 in a repository 130. The repository 130 can be implemented using a number of storage devices, such as any or some combination of a disk-based storage device, a solid-state storage device, and so forth. The repository 130 can be part of or external of the monitoring system manager 102.

In some examples, mapping information 132 can correlate different data collection entity identifiers (IDs) 134 to respective metadata 128. In some examples, the mapping information 132 can be in the form of a lookup table having entries each correlating a respective ID 134 to a respective metadata 128. An identifier can refer to a number, a string of characters (e.g., numbers, letters, etc.) to uniquely identify a corresponding data collection entity, such as an agent 104, a device 110, and/or a sensor 112. An example of an ID is a universally unique identifier (UUID).

In some examples, a message carrying sensor data transmitted by an agent 104 to the monitoring system manager 102 can further include a data collection entity ID, which can be used by the monitoring system manager 102 to retrieve a corresponding metadata 128 based on the mapping information 132 correlating the data collection entity ID in the message to the corresponding metadata 128.

Further, messages carrying sensor data have a common format according to a schema (or multiple schemas) defined by schema information 124. Such messages having the common format can be referred to as "standardized messages" that the monitoring system manager 102 can expect to receive from agents 104. The schema information 124 can be stored in a repository 126. The repository 126 can be implemented using a number of storage devices. The repository 126 is coupled to the network 108 such that entities (including the agents 104 and the monitoring system manager 102) on the network 108 can access the schema information 124.

In other examples, the schema information 124 can be stored in a storage of the monitoring system manager 102, such as in the repository 130.

In some examples, the schema information 124 can be part of a schema registry according to Apache Avro™. Avro™ provides a data serialization system to communicate data having a specified format. In other examples, other types of schemas can be employed for messages carrying sensor data.

In some examples, the schema information 124 can be extended or modified to support changed formats for messages carrying sensor data, to meet new specifications without losing backward or forward compatibility. As a result of the ability to extend or modify the schema information 124, a dynamic data model is enabled for the lifetime of the monitoring framework such that changing customer specifications for data monitoring can be accommodated.

In addition, any agent 104 from any source can be added to the monitoring framework provided by the monitoring system manager 102. As a result, the monitoring framework would not have to restrict data collection to agents from specific sources, but instead, any agent from any source can be added to the monitoring framework so long as the agent supports message formatting according to the schema information 124.

In some examples, by using standardized messages, agents from different sources can be transparent to the monitoring system manager 102 (in other words, the monitoring system manager 102 does not have to be aware of any specific specifications of an agent 104 and still be able to receive messages carrying sensor data from the agent 104). In this manner, the monitoring system manager 102 can work with newly added agents 104 without having to change the monitoring framework (e.g., change the monitoring framework to support new formats of newly added agents).

Figure 2:
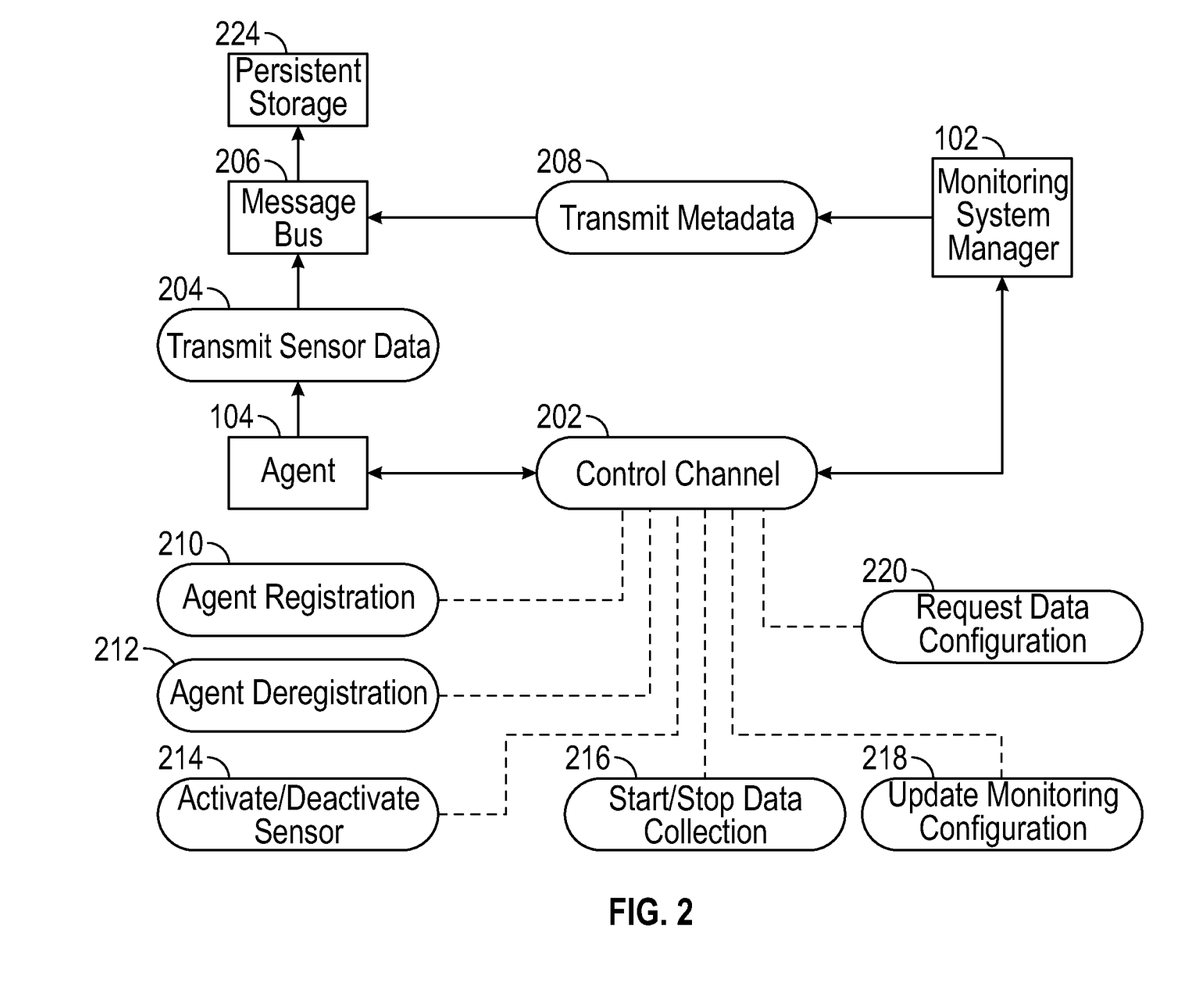
FIG. 2 is a block diagram of a monitoring framework according to some examples.

FIG. 2 is a block diagram of an example of a monitoring framework 200 according to some implementations of the present disclosure. The monitoring framework 200 supports control data provided over a control channel 202, sensor data 204 transmitted by an agent 104 over a message bus 206, and metadata 208 transmitted by the monitoring system manager 102 over the message bus 206.

As used here, a "message bus" refers to a communication link having characteristics governed by a protocol, which can be a standardized protocol, open-source protocol, or proprietary protocol. For example, the message bus 206 can be a software bus provided by Apache Kafka™, which provides an open-source platform. Using such message bus 206, recipients (e.g., consumers 118 or the monitoring system manager 102) can subscribe to a data feed (containing sensor data) provided by producers (e.g., agents 104).

Another message-based system that can be used includes RabbitMQ™, which provides a message-oriented middleware to allow for communication of messages (including sensor data) between the agents 104 and other entities, such as the consumers 118 and the monitoring system manager 102.

In other examples, other types of communication links can be employed. An interface (such as the subscription-based interface of Kafka™ or a message-oriented broker of RabbitMQ™) can be associated with a communication link to allow a recipient (e.g., consumer 118 or monitoring system manager 102) to receive sensor data from an agent 104.

The "control channel" 202 can refer to any interface over which control messages can be sent, such as from the agent 104 to the monitoring system manager 102, or vice versa. The control channel 202 enables dynamic configuration of system monitoring by agents 104, and helps to reduce monitoring data transmission sizes.

For example, the agent 104 can perform registration (210) over the control channel 202 with the monitoring system manager 102 before sending any sensor data. A registration procedure allows the agent 104 to identify itself to the monitoring framework, and allows the agent 104 to register its device(s) 110 and sensor(s) 112. The registration can provide to the monitoring system manager 102 metadata about the agent 104 (e.g., type of agent, identifier, description, etc.), its connected device(s) 110 (e.g., location, identifier, type, etc.) and device sensor(s) 112 (e.g., identifier, minimum data collection frequency, maximum data collection frequency, default data collection frequency, valid value range of a metric collected by a sensor 112, unit of measurement, type of metric measured, etc.).

Although examples of metadata are given above, it is noted that in other examples, additional or alternative metadata can be provided by agents 104 during registration.

The metadata can be used by the monitoring system manager 102 to dynamically control the connected agents 104 (e.g., change collection frequency for an agent 104, a specific device 110, or a specific sensor 112, disable or enable a sensor 112, perform automatic checks on collected sensor data, etc.).

As part of the registration, sensors 112 can be associated with respective metadata, such as based on the monitoring system manager 102 updating the mapping information 132 of FIG. 1 that can correlate sensor IDs to metadata, for example. With such association, sensors 112 can send messages with sensor data but without the metadata (thereby reducing message sizes) already provided to the monitoring system manager 102 as part of agent registration.

As an example, a message carrying sensor data of a sensor 112 and transmitted by an agent 104 can have the following triplet form: {timestamp, sensor ID, and value}, where "value" represents a sensor measurement of the sensor 112. When the monitoring system manager 102 receives the message, the sensor ID is used to retrieve the corresponding metadata, which can then be used by the monitoring system manager 102 controlling monitoring operations or other tasks.

In other examples, a message carrying sensor data can have a different form.

As further shown in FIG. 2, the agent 104 can perform deregistration (212) over the control channel 202 with the monitoring system manager 102. The deregistration can remove sensor(s) 112, device(s) 110, or the entire agent 104 from being active in the monitoring framework—i.e., the deregistered sensor(s) 112, device(s) 110, or agent 104 would no longer be transmitting sensor data.

The monitoring system manager 102 can also perform other configuration operations with respect to the agent 104 or its connected device(s) 110 or sensor(s) 112. For example, the monitoring system manager 102 can activate or deactivate (214) a sensor 112 or multiple sensors 112, such as by sending activation or deactivation message(s). Activating a sensor 112 causes the sensor to become ready to collect data, while deactivating a sensor 112 causes the sensor to no longer be able to collect data.

As another example, the monitoring system manager 102 can start or stop data collection (216) by a sensor 112, such as by sending a start message or a stop message. A start message can cause an active sensor 112 to start data collection. A stop message can cause an active sensor 112 to stop data collection.

As another example, the monitoring system manager 102 can change sensor collection behavior (218), such as by changing a frequency at which a sensor(s) 112 collects data, changing a time interval over which a sensor(s) 112 collects data, changing metric(s) collected, and so forth.

As a further example, the monitoring system manager 102 can update a monitoring configuration (218) of the agent 104 or its connected device(s) 110 or sensor(s) 112. This can be performed by sending a configuration update message to the agent 104. Note that activating or deactivating sensors (214), starting or stopping sensor collections (216), and changing sensor behavior (218) are examples of a configuration update. Note that instead of separately listing configuration operations 214, 216, and 218, these configuration operations can be included as part of configuration updates 218.

In some examples, it is also possible for the agent 104 to initiate a configuration operation (any of 214, 216, 218, and 220) with the monitoring system manager 102. For example, the agent 104 can send its monitoring configuration to the monitoring system manager 102 so that the monitoring system manager 102 can set the monitoring configuration for the agent 104. As another example, the agent 104 can update the monitoring configuration and send the updated monitoring configuration (e.g., a sensor has been activated or deactivated, a sensor has been started or stopped, etc.) to the monitoring system manager 102.

The agent 104 can store its copy of configuration data (which may also be stored by the monitoring system manager 102). The configuration data may include information defining a monitoring configuration. If the agent 104 were to lose its configuration data for any reason (e.g., due to a failure, fault, or data error), then the agent 104 may request the configuration data (220) from the monitoring system manager 102. Similarly, the monitoring system manager 102 may request configuration data from the agent 104.

Metadata 208 sent by the monitoring system manager 102 over the message bus 206 can be stored in persistent storage 224 (e.g., in the repository 130 of FIG. 1). Sensor data 204 sent by the agent 104 over the message bus 206 can also be stored by the monitoring system manager 102 in the persistent storage 224, which can be later retrieved, such as by a consumer 118. Additionally, the monitoring system manager 102 may forward the sensor data to another entity, such as a consumer 118.

The following describes an example scenario. A consumer 118 can submit a job request that indicates a frequency of monitoring to be performed of the computing environment 106 (FIG. 1). The job scheduler 120 processes the job request and schedules the requested job for execution on identified resources (e.g., a computing node or multiple computing nodes).

The job scheduler 120 can notify the monitoring system manager 102 that a monitoring job is requested where data collection is to occur (e.g., in a list of computing nodes) at a specified frequency, for example. The job notification from the job scheduler 120 to the monitoring system manager 102 can further indicate, for example, selected sensor(s) 112 to use, a category of sensor(s) 112 (e.g., temperature sensor, a power consumption sensor, a sensor to track processor usage, etc.), indicated specific sensors, a category (for example, power and energy readings), metric(s) to collect, and so forth.

In response, the monitoring system manager 102 can contact agents 104 (that are already running) at the computing node(s) in the list to start data monitoring. Moreover, the monitoring system manager 102 may start agents 104 at the computing node(s). The monitoring system manager 102 can provide configuration data for the monitoring job to the contacted and/or started agents 104, where the configuration data can identify the sensor(s) 112 to use for data collection, the data collection frequency, and so forth.

In some examples, a consumer 118 submitting a job request may specify the generation of job-specific topics in the monitoring framework. A job-specific topic can refer to a category of data to be collected, e.g., a topic relating to measurements made by sensors, a topic relating to events, and so forth. Each job-specific topic may be associated with a corresponding queue to store the respective data.

After the configuration of agents and applicable devices and/or sensors is successfully completed, the monitoring system manager 102 can inform the job scheduler 120.

After successful dynamic setup of the monitoring infrastructure, the monitoring job is started. If job-specific topics are used, agents 104 can write data for the topics to respective queue. The consumer 118 that submitted that job request can access the collected sensor data, possibly in respective queues.

In another example scenario, a dynamic change of data collection by the monitoring framework can be based on detecting a specified event, such as an anomaly. For example, if a performance of a program (expressed as a quantity of input/output (I/O) transactions per time interval) is less than a specified threshold, then information relating to the anomaly is provided to the monitoring system manager 102.

The monitoring system manager 102 retrieves information pertaining to the resources on which the program is executed, and retrieves a monitoring configuration associated with the anomaly. For example, the monitoring configuration can specify an increased collection frequency for metrics relating to I/O transactions of the program.

The monitoring system manager 102 can send the monitoring configuration to the appropriate agent(s) 104 to collect data relating to the anomaly. The agent(s) 104 collect the data, which is then provided to the monitoring system manager 102 and/or a consumer 118. The collected data can be subjected to a root cause analysis to identify a root cause for the anomaly, for example.

In some examples, the dynamic monitoring framework discussed herein may provide some of the following examples. The standardization of framework messages by using schemas enables consumers to conveniently interface with the monitoring framework using an interface. The dynamic monitoring framework is able to adapt customer requirements without having to make changes to the underlying framework.

Additionally, resources allocated to monitoring being performed by the monitoring framework can be adjusted as the monitoring load changes. For example, a relatively small amount of resources may be initially allocated to the monitoring framework, and as the monitoring load increases, additional resources can be assigned.

Moreover, agents from various different sources can be dynamically added to or removed from the monitoring framework, so long as the agents support messages according to the specified schema(s).

Dynamic configuration of the monitoring framework can also provide flexibility in the metrics that are monitored, to support the addition of new services that may be based on certain metrics.

The separation of sensor data and metadata allows for the monitoring framework to more efficiently communicate vast amounts of sensor data collected by agents. Also, in some examples, a publish-subscribe communication model (where a consumer subscribes to sensor data published by an agent) allows for a more efficient technique of communicating data to consumers. Extensible or modifiable schemas allow message formats to change over time to support new devices and/or sensors, while still providing backward or forward compatibility.

Figure 3:
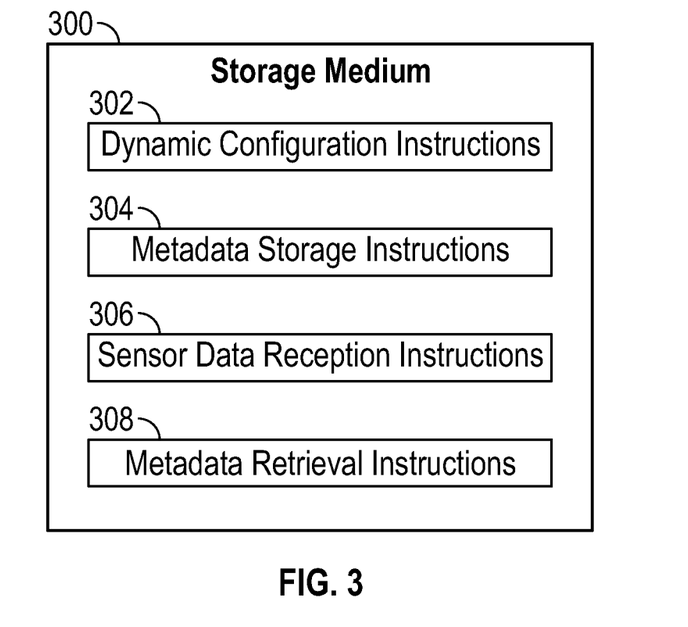
FIG. 3 is a block diagram of a storage medium storing machine-readable instructions according to some examples.

FIG. 3 is a block diagram of a non-transitory machine-readable or computer-readable storage medium 300 storing machine-readable instructions that upon execution cause a controller to perform various tasks. The controller can include the monitoring system manager 102 of FIG. 1, for example.

The machine-readable instructions include dynamic configuration instructions 302 to dynamically configure a property associated with monitoring performed by an agent (e.g., 104 in FIG. 1). Dynamically configuring the property can refer to dynamically configuring one property or multiple properties. The dynamic configuration can be for a monitoring job requested by a consumer, or for a monitoring job initiated in response to a specified event.

The machine-readable instructions include metadata storage instructions 304 to store, in a repository (e.g., 130) metadata relating to the agent. In some examples, the metadata includes information of a property of a sensor that is part of or coupled to the agent. The metadata can also include information relating to a device and the agent. The property of the sensor relates to an operational characteristic (e.g., frequency of data collection by the sensor, etc.) of the sensor or a data characteristic of data (e.g., valid value range) collected by the sensor.

The machine-readable instructions include sensor data reception instructions 306 to receive, from the agent, first sensor data that excludes the metadata. In some examples, the first sensor data is according to a format defined by a syntax that governs formatting of sensor data from agents that interact with the controller. The metadata can be received from the agent as part of a registration performed by the agent with the controller.

The machine-readable instructions include metadata retrieval instructions 308 to use indexing information (e.g., an identifier of a sensor or another data collection entity) in the first sensor data to retrieve the metadata from the repository. The retrieved metadata can be used to ascertain the monitoring configuration and other details associated with the sensor data, such as identifiers and locations of the corresponding agent 104 and device 110.

Figure 4:
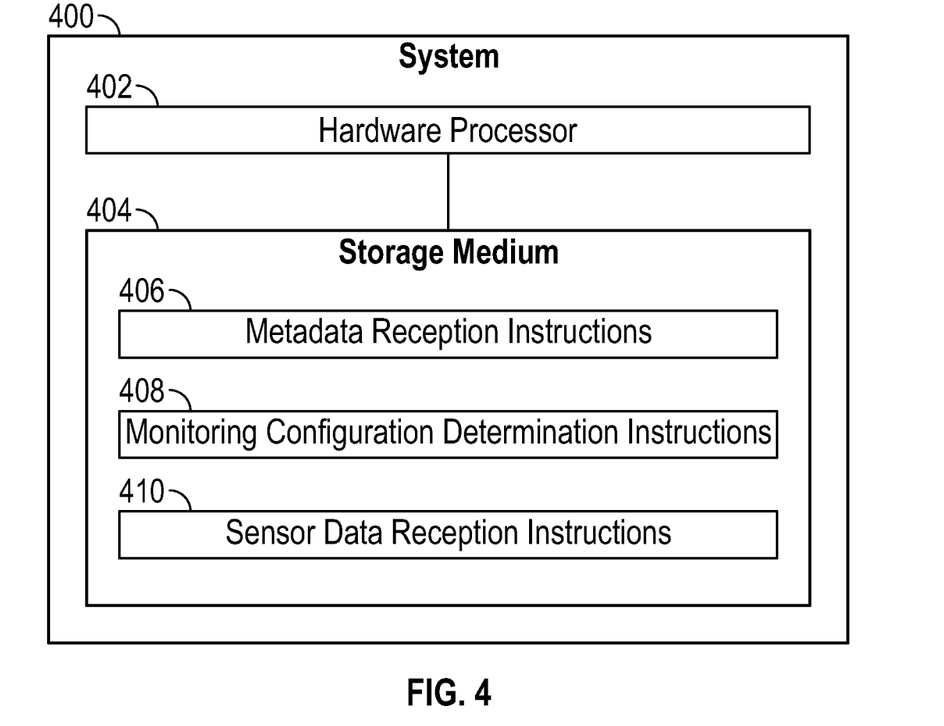
FIG. 4 is a block diagram of a system according to some examples.

FIG. 4 is a block diagram of a system 400 according to some examples. The system 400 can be the monitoring system manager 102 for example. The system 400 includes a hardware processor 402 (or multiple hardware processors). A hardware processor can include a microprocessor, a core of a multi-core microprocessor, a microcontroller, a programmable integrated circuit, a programmable gate array, or another hardware processing circuit.

The system 400 further includes a storage medium 404 storing machine-readable instructions executable on the hardware processor 402 to perform various tasks. Machine-readable instructions executable on a hardware processor can refer to the instructions executable on a single hardware processor or the instructions executable on multiple hardware processors The machine-readable instructions include metadata reception instructions 406 to receive, from an agent, metadata relating to the agent as part of registration performed by the agent. The metadata received by the system 400 can be stored in a repository (e.g., 130 in FIG. 1) that contains mapping information (e.g., 132) that correlates sensor identifiers (or identifiers of other data collection entities) to corresponding metadata.

The machine-readable instructions include monitoring configuration determination instructions 408 to determine a monitoring configuration of the agent based on the metadata. The monitoring configuration specifies properties associated with collection of sensor data by agents.

The machine-readable instructions include sensor data reception instructions to receive, from the agent, sensor data that excludes the metadata, where the sensor data is collected according to the monitoring configuration. The sensor data is included in a message that excludes the metadata. As a result, the message size can be reduced.

Figure 5:
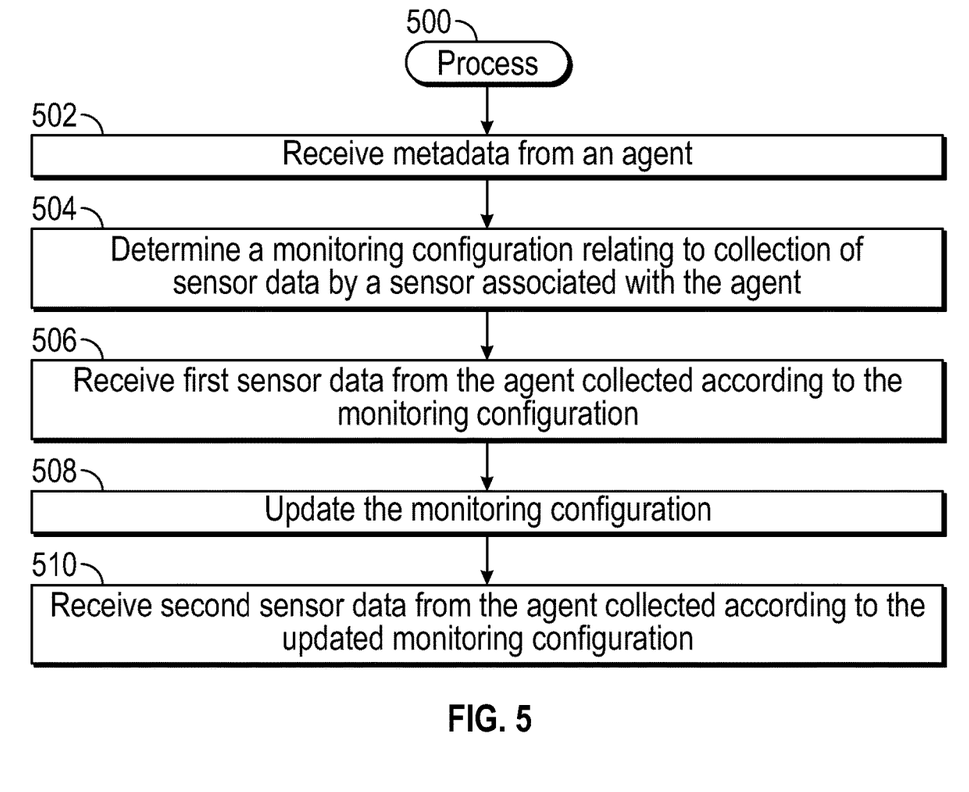
FIG. 5 is a flow diagram of a process according to some examples.

FIG. 5 is a flow diagram of a process 500 according to some examples.

The process 500 includes a controller (e.g., the monitoring system manager 102 of FIG. 1) receiving (at 502) metadata from an agent. The metadata can be received when the agent registers with the controller, for example.

The controller determines (at 504) a monitoring configuration relating to collection of sensor data by a sensor associated with the agent. The monitoring configuration can be dynamically set by the controller based on the metadata, or the monitoring configuration can be set based on configuration data sent by the agent to the controller.

The controller receives (at 506) first sensor data from the agent collected according to the monitoring configuration. The first sensor data is included in a first message that excludes the metadata.

The controller updates (at 508) the monitoring configuration. The update of the monitoring configuration can be initiated by the controller, or can be requested by the agent.

The controller receives (at 510) second sensor data from the agent collected according to the updated monitoring configuration. The second sensor data is included in a second message that excludes the metadata.

A storage medium (e.g., 300 in FIG. 3 or 404 in FIG. 4) can include any or some combination of the following: a semiconductor memory device such as a dynamic or static random access memory (a DRAM or SRAM), an erasable and programmable read-only memory (EPROM), an electrically erasable and programmable read-only memory (EEPROM) and flash memory or other type of non-volatile memory device; a magnetic disk such as a fixed, floppy and removable disk; another magnetic medium including tape; an optical medium such as a compact disk (CD) or a digital video disk (DVD); or another type of storage device. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A non-transitory machine-readable storage medium comprising instructions that upon execution cause a controller to:
   receive, at the controller, metadata from an agent associated with a sensor, wherein the metadata comprises an operational characteristic of the sensor;
   determine a monitoring configuration relating to collection of sensor data by the sensor associated with the agent;
   store, in a repository, mapping information correlating different indexing information to different metadata comprising operational characteristics of sensors;
   receive, at the controller, first sensor data from the agent collected according to the monitoring configuration, wherein the first sensor data is included in a first message comprising first indexing information and excluding the metadata comprising the operational characteristic of the sensor;
   use the first indexing information in the data message to retrieve the metadata comprising the operational characteristic of the sensor from the mapping information;
   update the monitoring configuration;
   receive, at the controller, second sensor data from the agent collected according to the updated monitoring configuration, wherein the second sensor data is included in a second message comprising the first indexing information and excluding the metadata comprising the operational characteristic of the sensor; and
   use the first indexing information in the second message to retrieve the metadata comprising the operational characteristic of the sensor from the mapping information.

2. The non-transitory machine-readable storage medium of claim 1, wherein the instructions upon execution cause the controller to:
   receive the first sensor data that is according to a format defined by a syntax that governs formatting of sensor data from agents that interact with the controller.

3. The non-transitory machine-readable storage medium of claim 1, wherein the instructions upon execution cause the controller to:
   receive the metadata comprising the operational characteristic of the sensor from the agent as part of a registration performed by the agent with the controller.

4. The non-transitory machine-readable storage medium of claim 1, wherein the operational characteristic of the sensor included in the metadata comprises a frequency of data collection by the sensor.

5. The non-transitory machine-readable storage medium of claim 1, wherein the operational characteristic of the sensor included in the metadata comprises a valid value range of data collected by the sensor.

6. The non-transitory machine-readable storage medium of claim 1, wherein the instructions upon execution cause the controller to:
   dynamically configure a property associated with monitoring performed by the agent by sending configuration data to the agent to operate according to the monitoring configuration.

7. The non-transitory machine-readable storage medium of claim 6, wherein the instructions upon execution cause the controller to dynamically configure the property associated with the monitoring performed by the agent in response to a job request that specifies a monitoring operation.

8. The non-transitory machine-readable storage medium of claim 1, wherein the first indexing information comprises an identifier of the sensor, the different indexing information in the mapping information comprise identifiers of different sensors.

9. The non-transitory machine-readable storage medium of claim 1, wherein the instructions upon execution cause the controller to:
   receive the monitoring configuration from the agent during registration.

10. The non-transitory machine-readable storage medium of claim 1, wherein the instructions upon execution cause the controller to:
update the monitoring configuration by sending a configuration update to the agent.

11. The non-transitory machine-readable storage medium of claim 1, wherein the first sensor data is received over a communication link associated with an interface to allow access of the first sensor data in transit from the agent to the controller.

12. The non-transitory machine-readable storage medium of claim 1, wherein the instructions upon execution cause the controller to:
perform deregistration relating to the agent to remove the agent or the sensor associated with the agent.

13. The non-transitory machine-readable storage medium of claim 1, wherein the instructions upon execution cause the controller to:
dynamically control the agent using the metadata.

14. A system comprising:
a processor; and
a non-transitory storage medium storing instructions executable on the processor to:
receive, at the system, metadata from an agent as part of registration performed by the agent, the metadata comprising an operational characteristic of a sensor associated with the agent;
store, in a repository, mapping information correlating different indexing information to different metadata comprising operational characteristics of sensors;
determine a monitoring configuration relating to collection of sensor data by the sensor associated with the agent;
receive, at the system, first sensor data from the agent collected according to the monitoring configuration, wherein the first sensor data is included in a first message comprising first indexing information and excluding the metadata comprising the operational characteristic of the sensor;
use the first indexing information in the first message to retrieve the metadata comprising the operational characteristic of the sensor from the mapping information;
update the monitoring configuration;
receive, at the system, second sensor data from the agent collected according to the updated monitoring configuration, wherein the second sensor data is included in a second message comprising the first indexing information and excluding the metadata comprising the operational characteristic of the sensor; and
use the first indexing information in the second message to retrieve the metadata comprising the operational characteristic of the sensor from the mapping information.

15. The system of claim 14, wherein the sensor data is according to a syntax represented by syntax information stored in a repository.

16. The system of claim 14, wherein the operational characteristic of the sensor included in the metadata comprises a frequency of data collection by the sensor or a valid value range of data collected by the sensor.

17. A method comprising:
receiving, by a controller, metadata from an agent associated with a sensor, wherein the metadata comprises an operational characteristic of the sensor;
determining, by the controller, a monitoring configuration relating to collection of sensor data by the sensor associated with the agent;
storing, in a repository, mapping information correlating different indexing information to different metadata comprising operational characteristics of sensors;
receiving, by the controller, first sensor data from the agent collected according to the monitoring configuration, wherein the first sensor data is included in a first message comprising first indexing information and excluding the metadata comprising the operational characteristic of the sensor;
using, by the controller, the first indexing information in the first message to retrieve the metadata comprising the operational characteristic of the sensor from the mapping information;
updating, by the controller, the monitoring configuration;
receiving, by the controller, second sensor data from the agent collected according to the updated monitoring configuration, wherein the second sensor data is included in a second message comprising the first indexing information and excluding the metadata comprising the operational characteristic of the sensor; and
using, by the controller, the first indexing information in the second message to retrieve the metadata comprising the operational characteristic of the sensor from the mapping information.

18. The method of claim 17, wherein the operational characteristic of the sensor included in the metadata comprises a frequency of data collection by the sensor.

* * * * *